United States Patent
Park et al.

(10) Patent No.: US 9,463,769 B2
(45) Date of Patent: Oct. 11, 2016

(54) AIR BAG CUSHION DEVICE FOR PROTECTING PEDESTRIAN

(71) Applicant: Hyundai Mobis Co., Ltd., Seoul (KR)

(72) Inventors: Hae Kwon Park, Yongin-si (KR); Seok Min Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/722,932

(22) Filed: May 27, 2015

(65) Prior Publication Data

US 2016/0023629 A1 Jan. 28, 2016

(30) Foreign Application Priority Data

Jul. 25, 2014 (KR) .................. 10-2014-0094793

(51) Int. Cl.
  *B60R 21/36* (2011.01)
  *B60R 21/2338* (2011.01)

(52) U.S. Cl.
  CPC ............ *B60R 21/36* (2013.01); *B60R 21/2338* (2013.01)

(58) Field of Classification Search
  CPC .......................... B60R 21/36; B60R 2021/346
  USPC ......................................................... 180/274
  See application file for complete search history.

(56) References Cited

U.S. PATENT DOCUMENTS

| | | | | |
|---|---|---|---|---|
| 7,584,988 B2* | 9/2009 | Okamoto | ............... | B60R 21/36 180/274 |
| 8,016,066 B1* | 9/2011 | Boxey | .................. | B60R 21/36 180/271 |
| 8,955,634 B2* | 2/2015 | Bergenheim | ........... | B60R 21/36 180/274 |
| 2006/0151228 A1* | 7/2006 | Kalliske | ............. | B60R 21/2338 180/274 |
| 2007/0023223 A1* | 2/2007 | Okamoto | ............ | B32B 17/0036 180/274 |
| 2007/0114090 A1* | 5/2007 | Okamoto | ................ | B60R 21/36 180/274 |
| 2009/0102167 A1* | 4/2009 | Kitte | ..................... | B60R 21/233 280/728.2 |
| 2009/0200778 A1* | 8/2009 | Ishikawa | ............. | B60R 21/2338 280/739 |
| 2014/0291054 A1* | 10/2014 | Tanaka | .................... | B60R 21/36 180/274 |
| 2015/0000994 A1* | 1/2015 | McLundie | ............. | B60R 21/34 180/274 |
| 2015/0090516 A1* | 4/2015 | Kitte | ....................... | B60R 21/36 180/274 |
| 2015/0144413 A1* | 5/2015 | Jeong | ................. | B60R 21/2346 180/274 |
| 2015/0175121 A1* | 6/2015 | Choi | .................. | B60R 21/2338 180/274 |
| 2015/0217719 A1* | 8/2015 | Vitet | ...................... | B60R 21/36 180/274 |

FOREIGN PATENT DOCUMENTS

| | | | | |
|---|---|---|---|---|
| JP | 2001026249 A | * | 1/2001 | ............ B60R 21/26 |
| JP | 2002-36986 | | 2/2002 | |
| JP | 2006-327360 | | 12/2006 | |
| JP | 4441444 | | 3/2010 | |
| JP | 4517873 | | 8/2010 | |
| JP | 4621119 | | 1/2011 | |
| JP | 4700450 | | 6/2011 | |
| KR | 10-2007-0062221 | | 6/2007 | |

* cited by examiner

*Primary Examiner* — Faye M Fleming
(74) *Attorney, Agent, or Firm* — H.C. Park & Associates, PLC

(57) ABSTRACT

An air bag cushion device for protecting a pedestrian including an inflator mounted on a vehicle body and generating working gas; a main chamber receiving the working gas generated from the inflator and expanding in a widthwise direction of the vehicle; and a sub-chamber connected to the main chamber, receiving the working gas through the main chamber, and expanding to the outside of an A-pillar of the vehicle body.

16 Claims, 15 Drawing Sheets

AIR BAG CUSHION DEVICE FOR PROTECTING PEDESTRIAN

CROSS-REFERENCES TO RELATED APPLICATION

The present application claims priority from and the benefit of Korean Patent Application number 10-2014-0094793, filed on Jul. 25, 2014, which is incorporated by reference for all purposes as if fully set forth herein.

BACKGROUND

1. Field

Exemplary embodiments of the present invention relate to an air bag cushion device for protecting a pedestrian, and more particularly, to an air bag cushion device for protecting a pedestrian, which is capable of reducing the injury of a pedestrian by spreading out an inflating air bag in a stable manner.

2. Discussion of the Background

In general, an engine compartment is arranged at the front of a vehicle, and includes an engine and a radiator arranged therein, and a hood for opening/closing the engine room is arranged at the top of the engine compartment. The rear side of the hood is hinge-coupled to the vehicle body, and the hood is opened and closed while the front side thereof is moved upward and downward.

When a vehicle collides with a pedestrian, the pedestrian may fall onto the hood of the vehicle. In this case, the pedestrian may bump the head against a wind shield glass or front pillar, thereby incurring a secondary injury. Recently, a variety of devices have been developed to reduce the likelihood and/or severity of a secondary injury of a pedestrian. The devices spread an air bag cushion between a vehicle and a pedestrian when the vehicle collides with the pedestrian, and thus, prevent a secondary injury of the pedestrian, which may occur when the pedestrian bumps his/her head or the like against the vehicle. However, the devices have a problem in that the air bag may not be evenly spread.

The above-described related art of the present invention is disclosed in Korean Patent Laid-open Publication No. 2007-0062221 published on Jun. 15, 2007 and titled "Bumper air bag structure".

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an air bag cushion device for protecting a pedestrian, which is capable of reducing the injury of a pedestrian by spreading out an air bag in a stable manner during the inflation period of the air bag.

Additional aspects will be set forth in the detailed description which follows, and, in part, will be apparent from the disclosure, or may be learned by practice of the inventive concept.

An exemplary embodiment of the present invention discloses an air bag cushion device for protecting a pedestrian, including: an inflator mounted on a vehicle body and generating a working gas; a main chamber for receiving the working gas generated from the inflator and expanding in a widthwise direction of the vehicle; and a sub-chamber, connected to the main chamber, for receiving the working gas through the main chamber, and expanding to the outside of an A-pillar of the vehicle body.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DESCRIPTION OF THE ILLUSTRATED EMBODIMENTS

Figure 1:
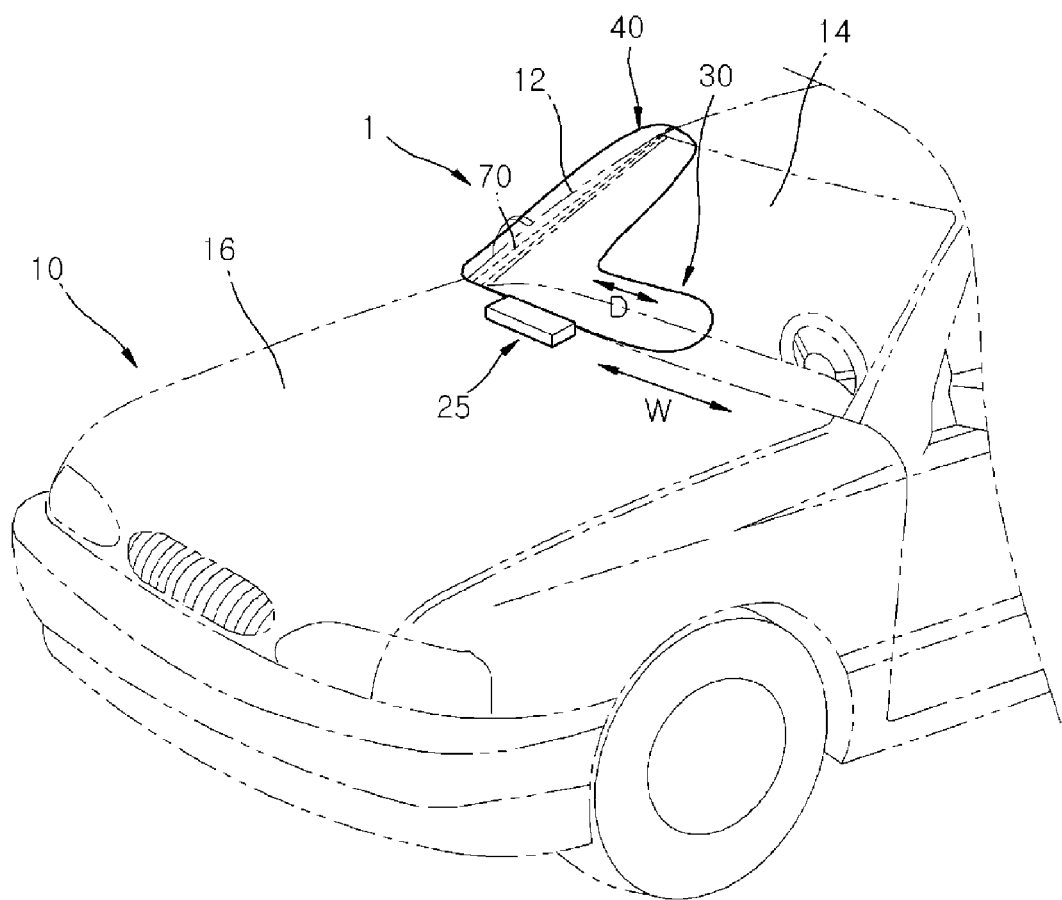
FIG. 1 is a perspective view schematically illustrating an operation state of an air bag cushion device for protecting a pedestrian in accordance with an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As illustrated in FIGS. 1, 2, 3A, and 3B, the air bag cushion device 1 for protecting a pedestrian in accordance with an exemplary embodiment of the present invention may include an inflator 20, a main chamber 30, and a sub-chamber 40. The inflator 20 may be mounted on a vehicle body 10 so as to generate working gas G. The main chamber 30 may receive the working gas G generated from the inflator 20, and expand in the widthwise direction W of the vehicle body 10. The sub-chamber 40 may be connected to the main chamber 30, receive the working gas G through the main chamber 30, and expand to the outside of an A-pillar 12 of the vehicle body 10.

The vehicle body 10 on which the air bag cushion device 1 is installed may include the A-pillar 12 installed at both sides of the windshield glass 14 of the vehicle and a hood 16 covering the engine room. The hood 16 may be positioned at the lower front of the windshield glass 14. When a pedestrian collides with the vehicle, the pedestrian may bump his/her head against the hood 16 or A-pillar 12. In this case, the pedestrian may have an additional injury. Furthermore, the vehicle body 11 may include a mounting bracket 22 for fixing the inflator 20 and a cover 25 fixed to cover the inflator 20.

The inflator 20 may be mounted on the vehicle body 10, and may be formed in various shapes as long as the inflator 20 can generate working gas G to expand the main chamber 30 and the sub-chamber 40 when the vehicle collides with a pedestrian. The inflator 20 may be operated by a sensor attached on the vehicle body 10, which activates the inflator 20 when the pedestrian collides with the vehicle body 10. The inflator 20 may inflate the main chamber 30 and the sub-chamber 40 using a working gas G, such as nitrogen, which is generated by momentarily burning a gas forming agent, such as sodium nitride, through an ignition system.

Figure 2:
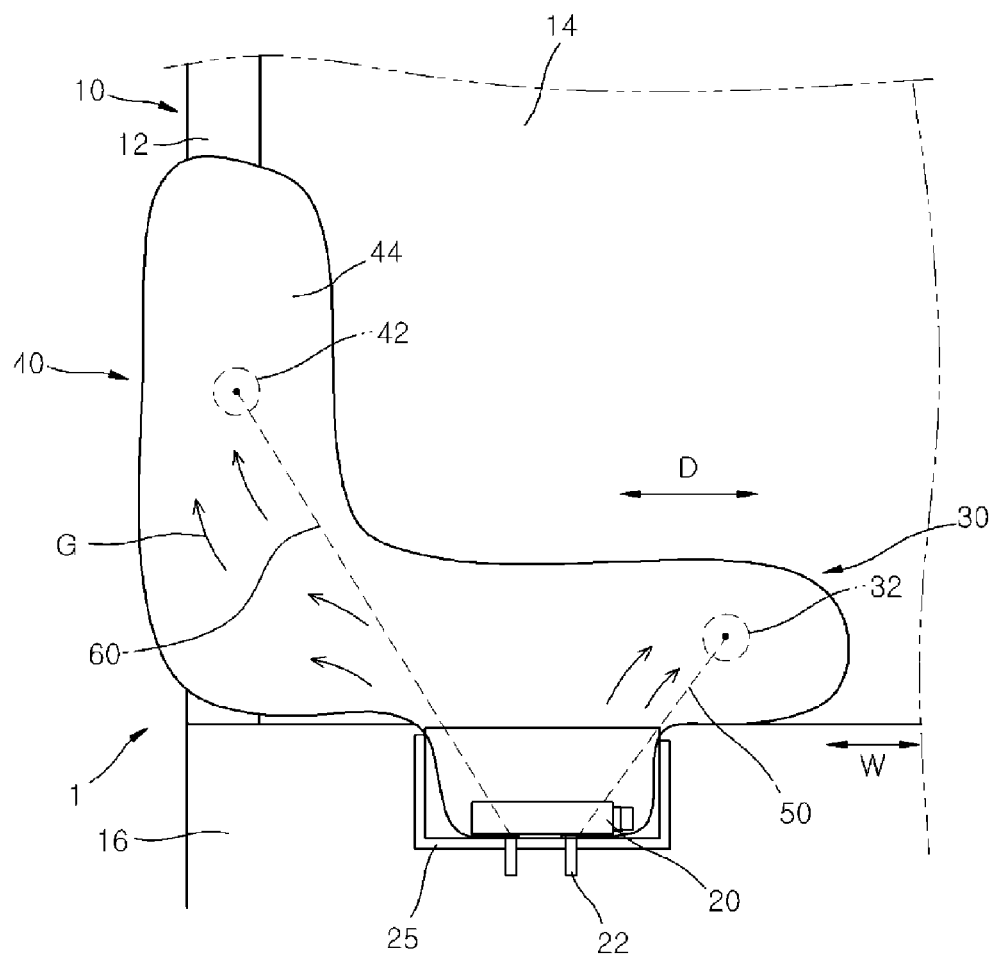
FIG. 2 is a front schematic view illustrating the structure of the air bag cushion device for protecting a pedestrian in accordance with an exemplary embodiment of the present invention.
Figure 3A:
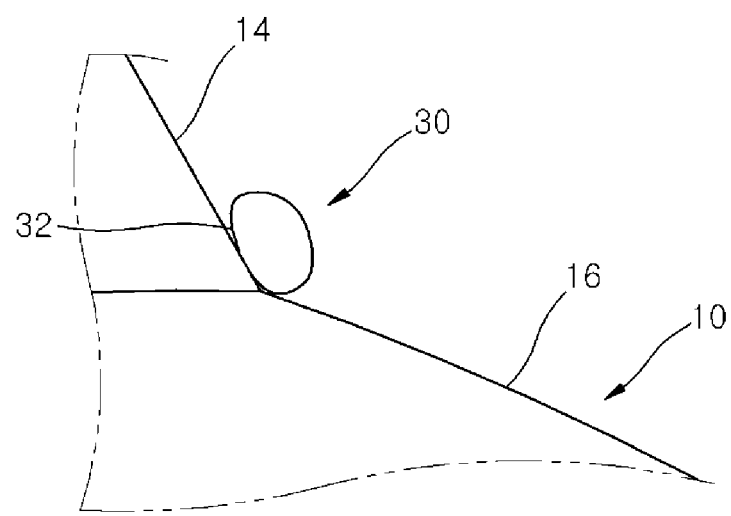
FIG. 3A is a diagram illustrating a cross-sectional transverse view of a main chamber of the air bag cushion device in accordance with an exemplary embodiment of the present invention.
Figure 3B:
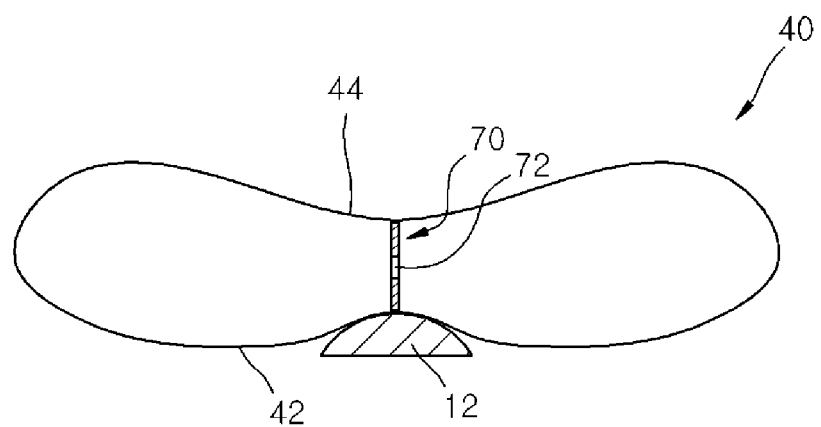
FIG. 3B is a diagram illustrating a cross-sectional transverse view of a sub-chamber of the air bag cushion device in accordance with an exemplary embodiment of the present invention.

The main chamber 30 may be formed in various shapes, as long as the main chamber 30 can receive the working gas G generated from the inflator 20 to expand in the widthwise direction W of the vehicle body 10 (the horizontal direction of FIG. 2). The main chamber 30 may expand along the boundary between the bottom of the windshield glass 14 and the hood 16. Thus, the main chamber 30 may prevent an additional injury of the pedestrian, which may occur when the pedestrian bumps his/her head against the hood 16 or the windshield glass 14. The main chamber 30 may be installed in such a manner that the inward-facing surface 32 thereof faces the windshield 14 and the hood 16, as shown in FIG. 3A. The inward-facing surface 42 of the sub-chamber 40, facing the A-pillar 12, may form a curved surface along the shape of the A-pillar 12, as shown in FIG. 3B.

The sub-chamber 40 may be connected to the main chamber 30 and formed in various shapes as long as the sub-chamber 40 can receive the working gas G through the main chamber 30 and expand to the outside of the A-pillar 12 of the vehicle body 10 so as to prevent a pedestrian from colliding with the A-pillar 12. The main chamber 30 may be positioned at the front surface of the windshield glass 14, and one side of the main chamber 30 extending in the longitudinal direction D may be connected to the sub-chamber 40. The sub-chamber 40 and the main chamber 30 may be formed in an L-shape so as to cover the A-pillar 12 of the vehicle body 10 and the front side of the windshield glass 14. The air bag cushion device 1 for protecting a pedestrian may also be installed on the opposite A-pillar facing the A-pillar 12 which has the sub-chamber 40 installed at the front side thereof, and reduce an injury of a pedestrian who collides with the vehicle. The sub-chamber 40 may be installed in such a manner that the inward-facing surface 42 thereof faces the A-pillar 12 of the vehicle body 10, and the outer surface 44 of the sub-chamber 40 may be isolated from the inward-facing surface 42 of the sub-chamber 40 so as to form the outside of the sub-chamber 40.

The air bag cushion device 1 for protecting a pedestrian may include the main chamber 30 and the sub-chamber 40 having one or more chambers. The main chamber 30 may absorb the initial pressure of the working gas G from the inflator, and distribute the working gas G to the respective chambers of the sub-chamber 40. Between the adjacent chambers of the sub-chamber 40, a second connection member 80 having a diaphragm shape and serving as an inner tether may be installed to adjust the distribution speed of the working gas G, and induce the sub-chamber 40 to spread along the vehicle body 10 including the A-pillar 12. Because first and second guide parts 50 and 60 serving as outer tethers are connected to the main chamber 30 and the sub-chamber 40, respectively, the first and second guide parts 50 and 60 may minimize left or right movement when the main chamber 30 and the sub-chamber 40 are spread apart. Furthermore, the first and second guide parts 50 and 60 may induce the main chamber 30 and the sub-chamber 40 to spread toward the windshield glass 14.

The first guide part 50 may connect the main chamber 30 to the vehicle body 10. The first guide part 50 may be formed in various shapes, as long as the first guide part 50 can guide the main chamber 30 to expand toward the vehicle body 10. The first guide part 50 may be formed in a string or wire shape. The top of the first guide part 50 may be connected to the inward-facing surface 32 of the main chamber 30, and the bottom of the first guide part 50 may be fixed to the vehicle body 10 or the inflator 20, as shown in FIG. 2. The bottom of the first guide part 50 may be fixed to the mounting bracket 22 for fixing the inflator 20, and the top of the first guide part 50 may be fixed to the inward-facing surface 32 of the main chamber 30. The first guide part 50 may be installed so as to be inclined in the upper-right diagonal direction based on the inflator 20. Thus, when the main chamber 30 is expanded by the working gas G, the first guide part 50 may pull the inward-facing surface 32 of the main chamber 30 toward the windshield glass 14. Thus, the main chamber 30 may be spread in a direction where the main chamber 30 comes in contact with the vehicle body 10, and then continuously maintain the contact with the vehicle body 10.

The second guide part 60 may connect the sub-chamber 40 to the vehicle body 10. The second guide part 60 may be formed in various shapes, as long as the second guide part 60 can be installed at a predetermined angle with respect to the first guide part 50 and guide the expansion of the sub-chamber 40. The bottom of the second guide part 60 may be fixed to the mounting bracket 22 for fixing the inflator 20, and the top of the second guide part 60 may be fixed to the inward-facing surface 42 of the sub-chamber 40, as shown in FIG. 2. The second guide part 60 may be installed so as to be inclined in the upper-left diagonal direction based on the inflator 20. Thus, when the sub-chamber 40 is expanded by the working gas G, the second guide part 60 may pull the inward-facing surface 42 of the sub-chamber 40 toward the A-pillar 12. Thus, the sub-chamber 40 may be spread in a direction where the sub-chamber 40 comes in contact with the A-pillar 12, and then continuously maintain the contact with the A-pillar 12.

Because the first and second guide parts 50 and 60 are extended in the opposite diagonal directions from the mounting bracket 22 on which the inflator 20 is installed, the main chamber 30 and the sub-chamber 40 may be spread in a direction where the main chamber 30 and the sub-chamber 40 come in contact with the vehicle body 10. In order for the main chamber 30 and the sub-chamber 40 to expand while rotating in a direction facing the vehicle body 10, the first guide part 50 may be connected to the inward-facing surface 32 of the main chamber 30, facing the vehicle body 10, and the second guide part 60 may be connected to the inward-facing surface 42 of the sub-chamber 40, facing the vehicle body 10. Because the first and second guide parts 50 and 60 are installed, the main chamber 30 and the sub-chamber 40 may be rotated in the direction facing the vehicle body 10 and maintain contact with the vehicle body 10, including the A-pillar 12.

Figure 11:
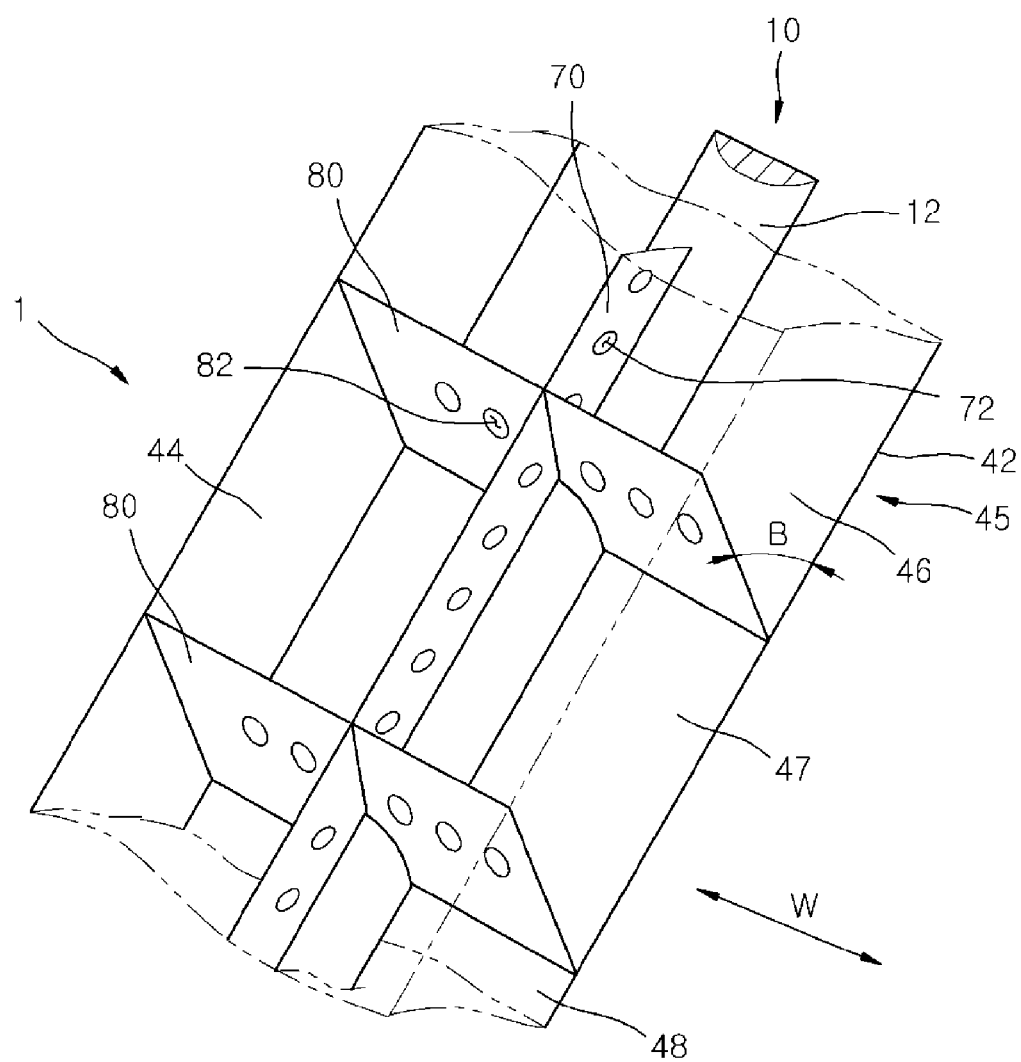
FIG. 11 is a perspective view illustrating a state in which the first and second connection members are installed in the sub-chamber, in accordance with an exemplary embodiment of the present invention.

A first connection member 70 may be installed in the longitudinal direction (slanting direction of windshield in FIG. 2) inside the sub-chamber 40 facing the A-pillar 12, as shown in FIG. 11. The first connection member 70 may be formed in various shapes as long as the first connection member 70 can connect the inward-facing surface 42 of the sub-chamber 40, facing the A-pillar 12, to the outer surface 44 of the sub-chamber 40, isolated from the A-pillar 12, as shown in FIG. 11. In the air bag cushion device 1 for protecting a pedestrian, after the air bag is spread, the sub-chamber 40 needs to be held on the A-pillar 12 without left or right movement, until the pedestrian collides the main chamber 30 or the sub-chamber 40. In order for the sub-chamber 40 to be held on the A-pillar 12 for a long time, the shape of the inward-facing surface 42 of the sub-chamber 40 needs to be modified according to the shape of the A-pillar 12. The shape of the inward-facing surface 42 of the sub-chamber 40 may be modified by varying the height of the first connection member 70. When the height of the first connection member 70 is varied according to the curve of the A-pillar 12, the shape of the sub-chamber 40 may be modified according to the A-pillar 12 while the shapes of the inward-facing and outer surfaces 42 and 44 of the sub-chamber 40 connected to the first connection member 70 are varied. Because the first connection member 70 includes a plurality of connection holes 72 through which the working gas G passes, as shown in FIG. 11, the sub-chamber 40 positioned in the left and right side of the first connection member 70 may be easily expanded. At this time, a plurality of first connection members 70 may be installed in the sub-chamber 40, if necessary. The first connection member 70 may be formed of the same material as the sub-chamber 40, and include various types of materials as long as the first connection member 70 can be easily folded and expanded by the working gas G.

In an exemplary embodiment, the widthwise direction W of the vehicle body 10 and the longitudinal direction D of the main chamber 30 may indicate the same direction, as shown in FIG. 1.

Furthermore, in an exemplary embodiment, only one air bag cushion device 1 has been described, although the present invention is not so limited.

Hereafter, referring to the accompanying drawings, the operation state of the air bag cushion device 1 for protecting a pedestrian in accordance with an exemplary embodiment of the present invention will be described in detail.

When a pedestrian collides with the front of the vehicle body 10, the inflator 20 may be operated according to a measurement value of the sensor mounted on the vehicle body 10. The inflator 20 may be operated to generate working gas G, and the working gas G may be supplied to inflate the main chamber 30. Because the expansion of the main chamber 30 is guided by the first guide part 50, the main chamber 30 may be expanded while rotating in the direction facing the vehicle body 10. Thus, even after the main chamber 30 is completely expanded, the contact between the main chamber 30 and the vehicle body 10 may be maintained for a long period of time.

Furthermore, as the working gas G supplied to the main chamber 30 is transferred to the sub-chamber 40 connected to one side of the main chamber 30, the sub-chamber 40 may be expanded along the A-pillar 12. Because the rotation of the sub-chamber 40 toward the A-pillar 12 is guided by the second guide part 60, the contact between the sub-chamber 40 and the A-pillar 12 may be maintained for a long period of time, even after the sub-chamber 40 is completely expanded.

When the sub-chamber 40 is expanded, the first connection member 70 may control the shape of the inward-facing surface 42 of the sub-chamber 40. Thus, the sub-chamber 40 may be installed outside the A-pillar 12 in a state where the inward-facing surface of the sub-chamber 40 is varied along the shape of the curved surface of the A-pillar 12. Thus, because the sub-chamber 40 can maintain contact with the outside of the A-pillar 12 for a long period of time, the sub-chamber 40 may prevent an additional injury of the pedestrian, which may occur when the pedestrian collides with the A-pillar 12.

Hereafter, an air bag cushion device 3 for protecting a pedestrian in accordance with another exemplary embodiment of the present invention will be described in detail.

For convenience of description, the same components as those of the exemplary embodiment discussed above are represented by like reference numerals, and the detailed descriptions thereof are omitted herein.

Figure 4:
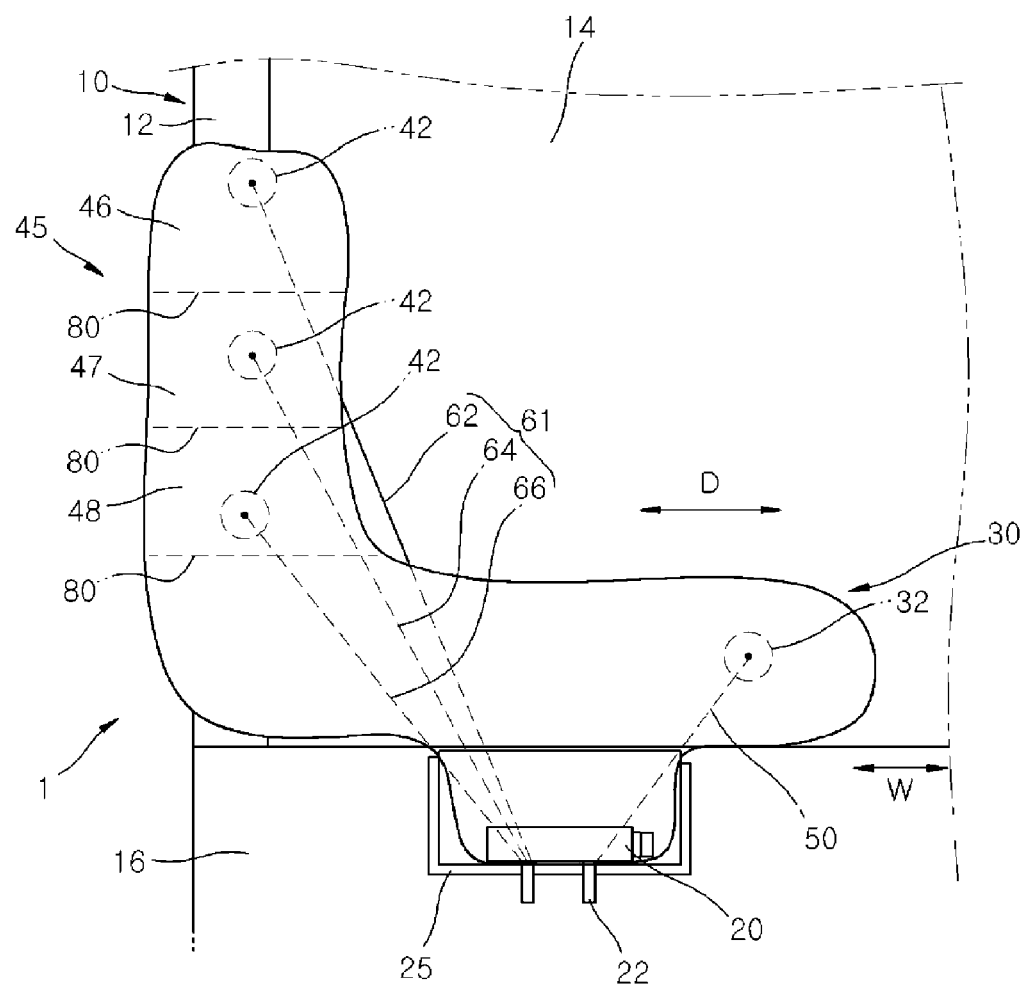
FIG. 4 is a front schematic view illustrating the structure of an air bag cushion device for protecting a pedestrian in accordance with an exemplary embodiment of the present invention.
Figure 6:
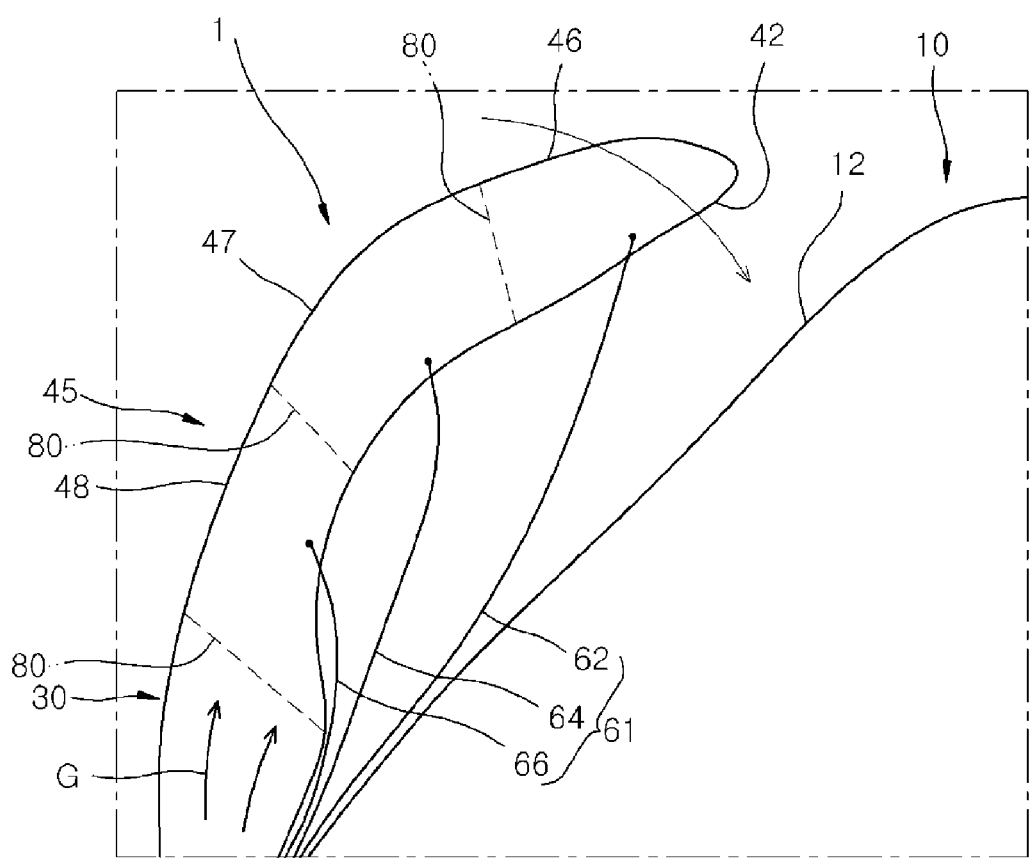
FIG. 6 is a side schematic view illustrating a state in which a sub-chamber is expanded while being guided by a second guide part in accordance with an exemplary embodiment of the present invention.

As illustrated in FIGS. 4 and 6, the air bag cushion device 3 for protecting a pedestrian in accordance with another exemplary embodiment may include a sub-chamber divided into a plurality of chambers. The sub-chamber 45 in accordance with this exemplary embodiment may be modified in various ways, as long as the sub-chamber 45 can be divided into a plurality of chambers by a second connection member 80 installed therein. The sub-chamber 45 may include first to third chambers 46, 47, and 48, and the second connection member 80 may be installed at the boundary between the respective chambers so as to divide the adjacent chambers. The number of chambers included in the sub-chamber 45 is not limited to three, but can be increased or decreased according to the use state.

The second guide part 61 may be modified in various ways, as long as the second guide part 61 can guide the sub-chamber 45 to come in contact with the vehicle body 10 while the sub-chamber 45 is rotated in a direction facing the vehicle body 10. The second guide part 61 in accordance with this exemplary embodiment may be connected to the plurality of chambers included in the sub-chamber 45. The second guide part 61 may include a first member 62 connected to the first chamber 46, a second member 64 connected to the second chamber 47, and a third member 66 connected to the third chamber 48. The tops of the first to third members 62 to 66 may be connected to the inward-facing surfaces 42 of the respective chambers, and the bottoms of the first to third members 62 to 66 may be fixed to the vehicle body 10 including the inflator 20 or the mounting bracket 22. Because the first and second guide parts 50 and 61 are installed in a V-shape around the inflator 20, the main chamber 30 and the sub-chamber 45, which are spread to both top sides of the inflator 20, may be expanded in a direction where the main chamber 30 and the sub-chamber 45 come in contact with the vehicle body 10.

As illustrated in FIGS. 7 to 10, the second connection member 80 installed in the sub-chamber 45 may have a plurality of second connection holes 82 through which working gas G passes. Inside the sub-chamber 45, the second connection member 80 may be installed in the widthwise direction W of the vehicle body 10. The second connection member 80 may be formed of a flexible material. One side of the second connection member 80 (right side in FIG. 9) may be fixed to the inward-facing surface 42 of the sub-chamber 45, and the other side of the second connection member 80 (left side in FIG. 9) may be fixed to the outer surface 44 of the sub-chamber 45. The other side of the second connection member 80 may be positioned at a lower level than the one side of the second connection member 80. Thus, when the working gas G is supplied through the second connection holes 82 of the second connection member 80, the sub-chamber 45 may be expanded, and the second connection member 80 may be installed in a diagonal direction while forming a preset inclined angle B with respect to the inward-facing surface of the sub-chamber 45.

If the second connection member 80 is not installed in the sub-chamber 45, the sub-chamber 45 may be bent to the outside of the A-pillar 12 while being spread by the working gas G. In this case, the sub-chamber 45 may be inflated in a state where the sub-chamber 45 is substantially perpendicular to the A-pillar 12.

Thus, when the inclined second connection member 80 is added to the inside of the sub-chamber 45, the rotation of the sub-chamber 45 may be induced in the clockwise direction (based on FIG. 10) about one side of the second connection member 80 connected to the inward-facing surface 42 of the sub-chamber 45. Furthermore, the flow of the working gas G supplied to the respective chambers may be adjusted through the second connection holes 82 formed in the second connection member 80.

Because the second connection member 80 is installed obliquely toward the A-pillar 12 when the sub-chamber 45 is spread, the working gas G passing through the second connection holes 82 of the second connection member 80 may pressurize the inward-facing surface 42 of the sub-chamber 45 toward the vehicle body 10. Thus, the sub-chamber 45 may be expanded to come in contact with the vehicle body 10 while rotating in the direction facing the vehicle body 10 (the clockwise direction in FIG. 10). When the sub-chamber 45 is spread upward along the A-pillar 12, the second connection member 80 may be installed in the horizontal direction of the sub-chamber 45 so as to guide the expansion of the sub-chamber 45.

Inside the sub-chamber 45, only the first connection member 70 may be installed in the vertical direction or only the second connection member 80 may be installed in the horizontal direction.

Alternatively, as illustrated in FIG. 11, the second connection member 80 and the first connection member 70 may be installed together in the sub-chamber 45. The first connection member 70 may be modified into various shapes, as long as the first connection member 70 is positioned in the sub-chamber 45 facing the A-pillar 12 and installed in a direction crossing the second connection member 80. The first connection member 70 may be installed in the sub-chamber 45 facing the A-pillar 12. As the height of the first connection member 70 is varied according to the shape of the A-pillar 12, the inward-facing surface 42 of the sub-chamber 45 may be deformed according to the shape of the A-pillar 12. Because the first connection member 70 in accordance with this exemplary embodiment has the same configuration and operation state as the first connection member 70 in the exemplary embodiment described above, the detailed descriptions thereof are omitted herein. Furthermore, the second and first connection members 80 and 70 may be installed to cross each other at various angles.

Figure 12A:
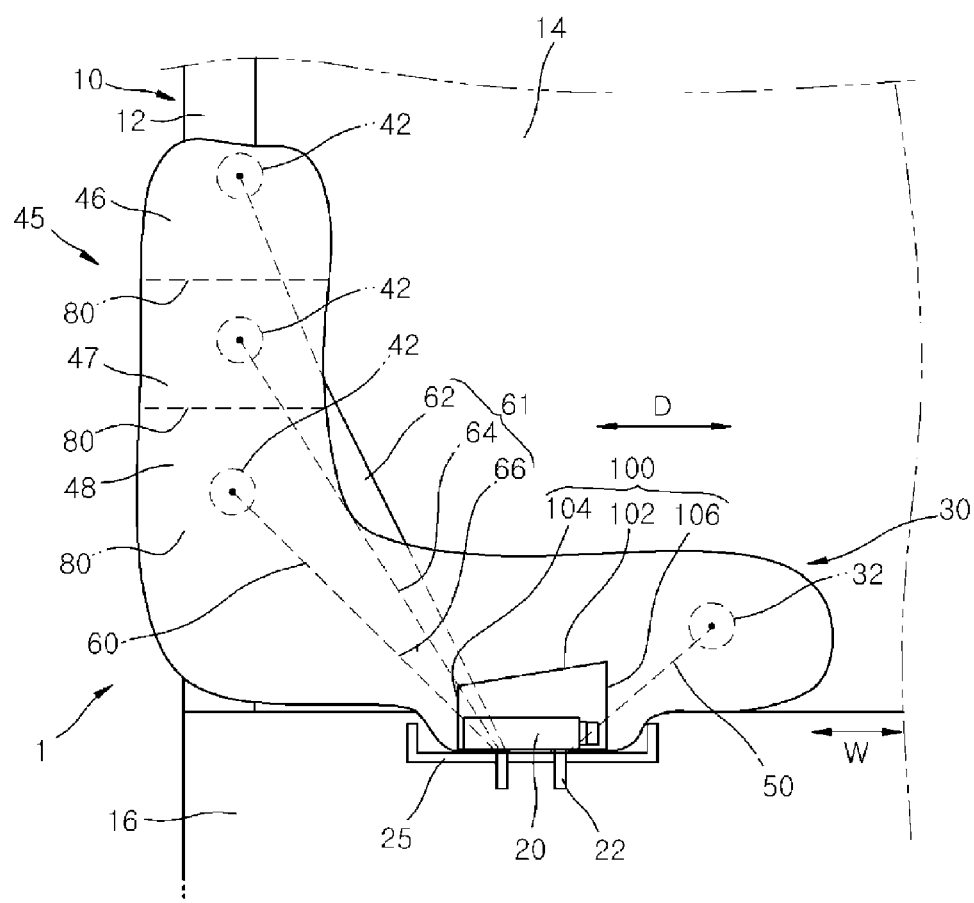
FIG. 12A is a front schematic view illustrating a state in which a gas discharge unit is installed outside an inflator, in accordance with an exemplary embodiment of the present invention.

As illustrated in FIG. 12A, a gas discharge unit 100 installed outside the inflator 20 may be formed in various shapes, as long as the gas discharge unit 100 can adjust the discharge amount of working gas G generated from the inflator 20 through discharge ports formed at both sides thereof. The gas discharge unit 100 in accordance with this exemplary embodiment may include a discharge body 102, a first discharge port 104, and a second discharge port 106.

The discharge body 102 may be formed in various shapes, as long as the working gas G generated from the inflator 20 can be supplied to the discharge body 102. The inflator 20 and the discharge body 102 in accordance with the present exemplary embodiment may be positioned in the main chamber 30, and the discharge body 102 may be installed to cover the outside of the inflator 20.

Figure 12B:
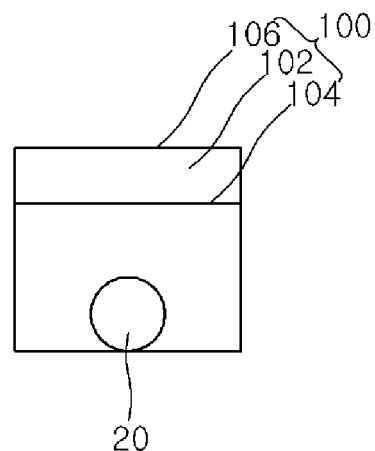
FIG. 12B and FIG. 12C are left and right side views, respectively, of the gas discharge unit shown in FIG. 12A.
Figure 12C:
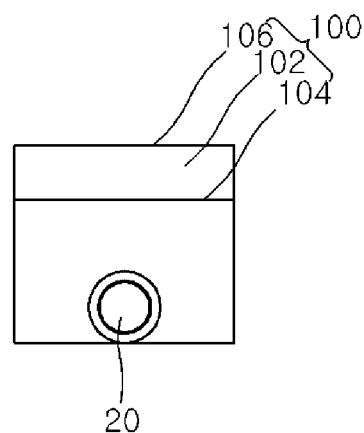

The first discharge port 104 may discharge the working gas G to the left side of the main chamber 30 (left side in FIG. 12A), facing the sub-chamber 45. The second discharge port 106 may discharge the working gas G to the right side of the main chamber 30 (right side in FIG. 12A), facing the opposite side of the first discharge port 104. FIG. 12B shows the left side of discharge body 102 including first discharge port 104, while FIG. 12C shows the right side of discharge body 102 including second discharge port 106. The second discharge port 106 in accordance with this exemplary embodiment may have a larger area than the first discharge port 104, as shown in FIGS. 12B and 12C. Thus, the left and right balance of the air bag cushion device 3 for protecting a pedestrian may be easily maintained.

The areas of the first and second discharge ports 104 and 106 may be changed to control the flow rate of the discharged working gas G. Thus, the left and right balance of the main chamber 30 and the sub-chamber 45 may be maintained. If the first discharge port 104 has a larger area than the second discharge port 106, the sub-chamber 45 may be excessively rotated. In this case, excessive expansion movement may occur.

Hereafter, referring to the accompanying drawings, the operation state of the air bag cushion device 3 for protecting a pedestrian in accordance with the second embodiment of the present invention will be described in detail.

Figure 5:
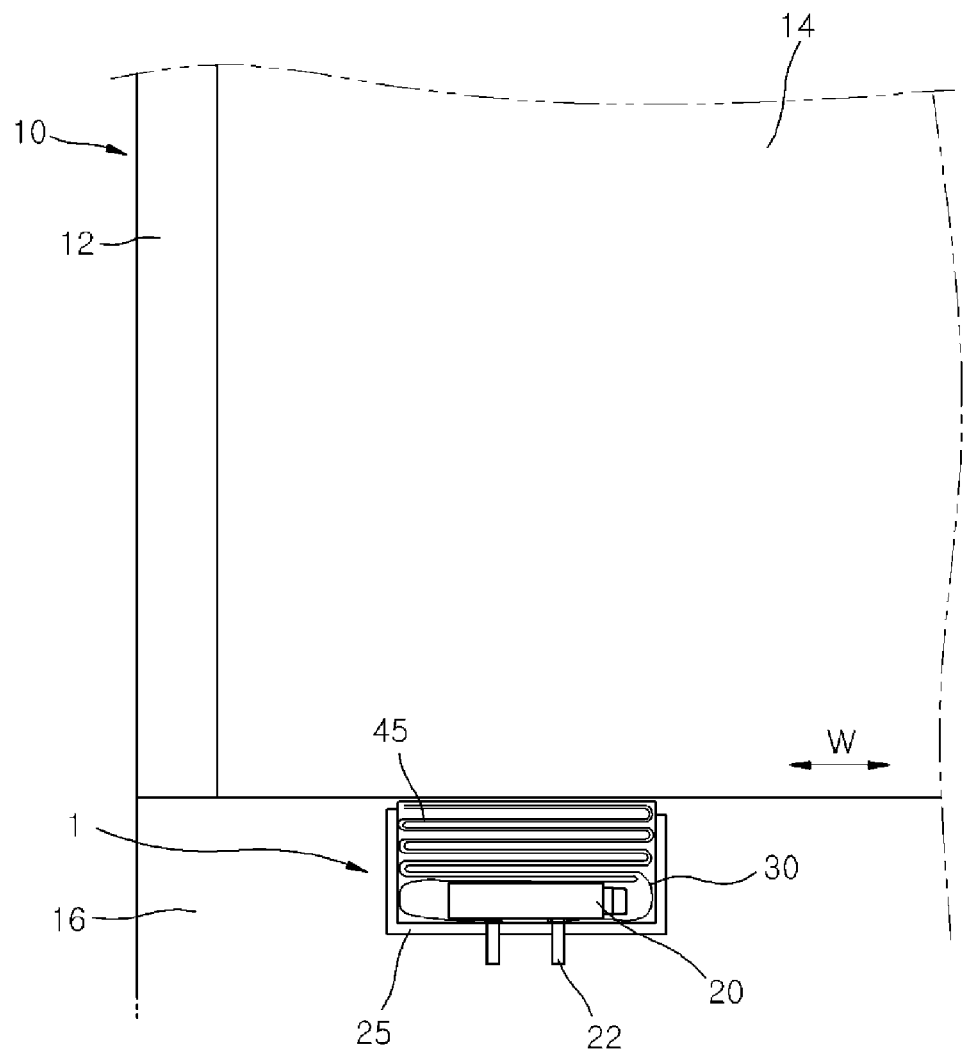
FIG. 5 is a front view schematic view illustrating a state of the air bag cushion device for protecting a pedestrian prior to inflation in accordance with an exemplary embodiment of the present invention.

As illustrated in FIG. 5, the main chamber 30 and the sub-chamber 45 may be stored inside the cover 25 with the inflator 20 at normal times. When the vehicle collides with a pedestrian, the sub-chamber 45 and the main chamber 30 may be expanded to the front of the A-pillar 12 and the front of the windshield glass 14, respectively, as illustrated in FIG. 4, thereby reducing the injury of the pedestrian.

The working gas G generated from the inflator 20 may expand the main chamber 30 to some extent. Then, the working gas G may be supplied to the respective chambers of the sub-chamber 45 through the second connection member 80 formed in the sub-chamber 45. The working gas G may be transferred to the third chamber 48, the second chamber 47, and the first chamber 46 through the second connection holes 82 formed in the second connection member 80.

Figure 7:
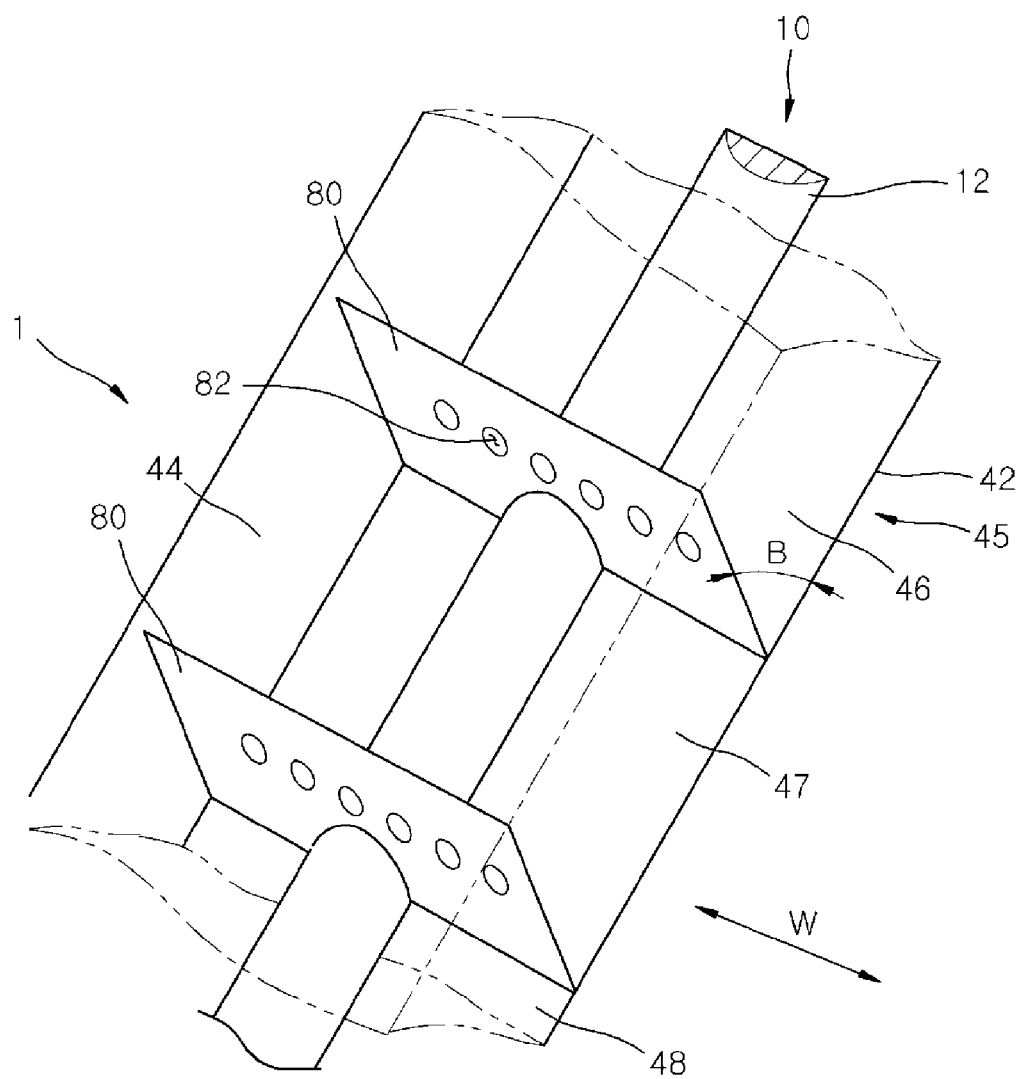
FIG. 7 is a perspective view illustrating a state in which a second connection member is installed in the sub-chamber in accordance with an exemplary embodiment of the present invention.
Figure 8:
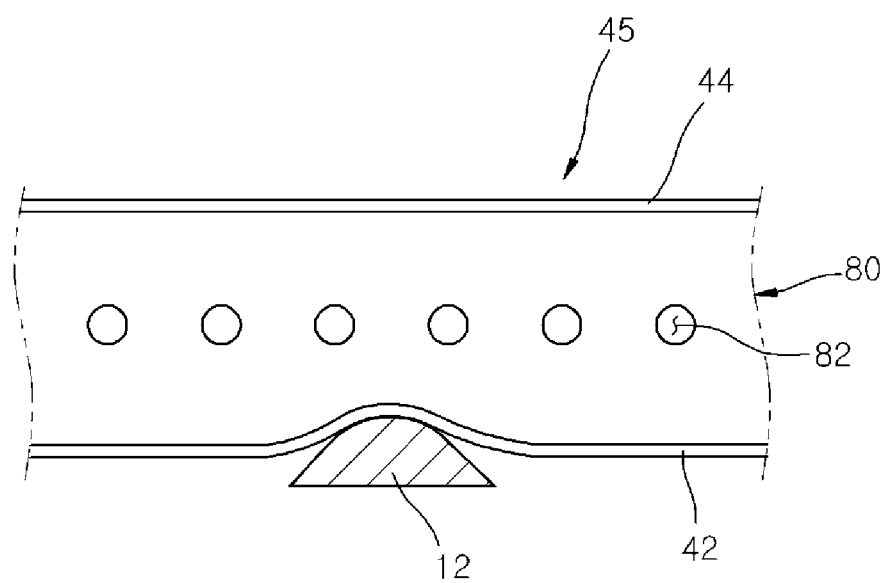
FIG. 8 is a plan view illustrating a state in which the second connection member in accordance with an exemplary embodiment of the present invention is installed.
Figure 9:
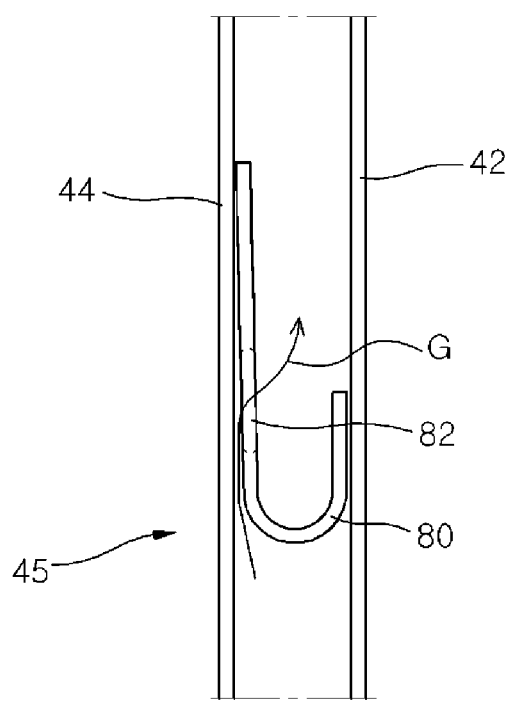
FIG. 9 is a schematic diagram illustrating that working gas starts to be transferred through a second connection hole in a state where the second connection member is folded in the sub-chamber, in accordance an exemplary embodiment of the present invention.
Figure 10:
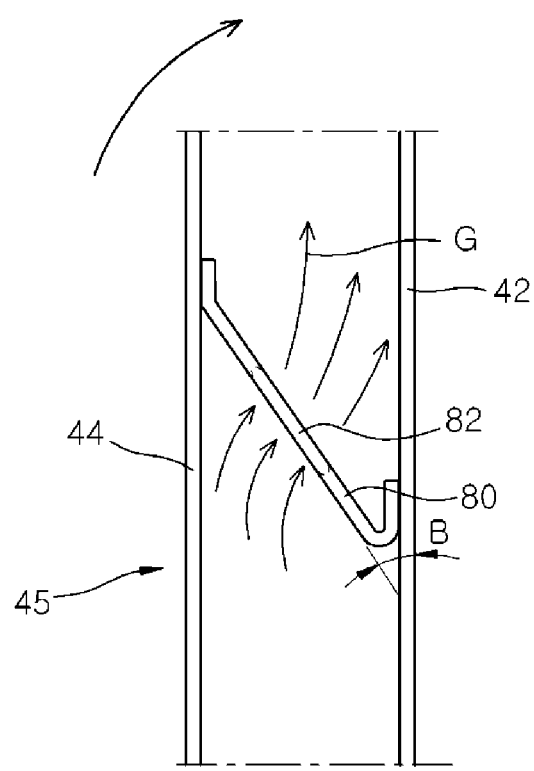
FIG. 10 is a schematic diagram illustrating a state in which the sub-chamber is rotated toward the vehicle body while the working gas is transferred through the second connection member, in accordance with an exemplary embodiment of the present invention.

As illustrated in FIGS. 6 and 7, the second connection member 80 may be installed at a preset inclined angle B. Thus, the working gas G passing through the second connection holes 82 formed in the second connection member 80 may be transferred while pressurizing the inward-facing surface 42 of the sub-chamber 45 toward the A-pillar 12. Thus, the sub-chamber 45 may be expanded while rotating in a direction where the sub-chamber 45 comes in contact with the vehicle body 10.

As illustrated in FIG. 11, when the second connection member 80 and the first connection member 70 are installed together, the shape of the inward-facing surface 42 of the sub-chamber 45, coming in contact with the A-pillar 12, may be deformed according to the shape of the outer surface 44 of the A-pillar 12. Thus, the sub-chamber 45 may be stably fixed to the outside of the A-pillar 12.

As illustrated in FIGS. 12A-12C, when the gas discharge unit 100 is installed outside the inflator 20, the main chamber 30 starts to expand before the sub-chamber 45, because a larger part of the working gas G generated from the inflator 20 is transferred through the second discharge port 106 having a larger area than the first discharge port 104. Thus, because the sub-chamber 45 starts to be expanded in a state where the main chamber 30 is expanded to some extent, the rotation of the main chamber 30, which occurs when the sub-chamber 45 is expanded, may be reduced to stably expand the sub-chamber 45.

Hereafter, an air bag cushion device 5 for protecting a pedestrian in accordance with still another exemplary embodiment of the present invention will be described in detail with reference to FIG. 13.

For convenience of description, the same components as those of the first exemplary embodiment are represented by like reference numerals, and the detailed descriptions thereof are omitted herein.

Figure 13:
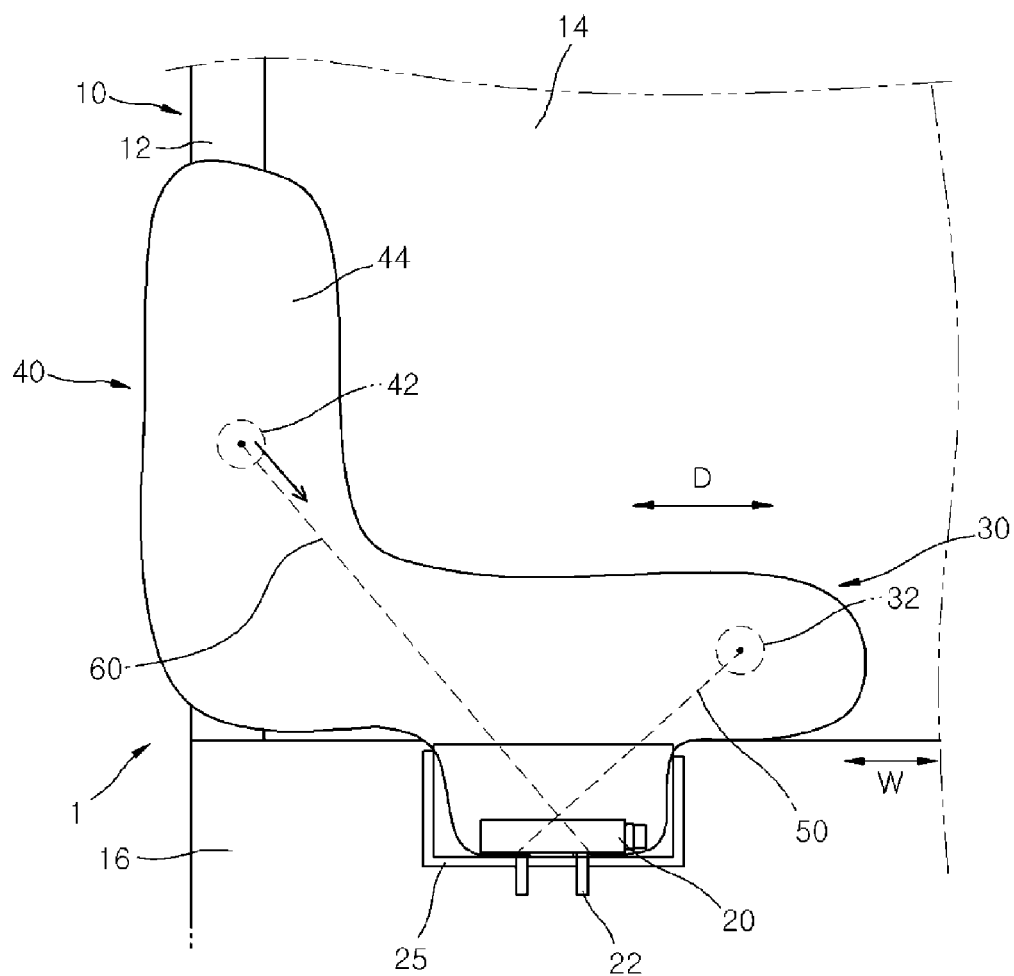
FIG. 13 is a front view illustrating the structure of an air bag cushion device for a protecting a pedestrian in accordance with an exemplary embodiment of the present invention.

FIG. 13 is a front view illustrating the structure of an air bag cushion device for a protecting a pedestrian in accordance with a third exemplary embodiment of the present invention.

As illustrated in FIG. 13, the tops of the first and second guide parts 50 and 60 may be connected to the main chamber 30 and the sub-chamber 40, respectively, and the bottoms of the first and second guide parts 50 and 60 may be connected to the mounting bracket 22 while crossing in an X-shape.

Because the first and second guide parts 50 and 60 serving as outer tethers are connected to the mounting points of the mounting bracket 22 from two or more points of the main chamber 30 and the sub-chamber 40, the first and second guide parts 50 and 60 may prevent left and right movements and upward spreading movements of the main chamber 30 and the sub-chamber 40 which are asymmetrical cushions.

The air bag cushion device 5 for protecting a pedestrian in accordance with the third exemplary embodiment may include a plurality of chambers formed in the sub-chamber 40, and the first and second connection members 70 and 80 serving as inner tethers and the first and second guide parts 50 and 60 serving as outer tethers in the sub-chamber 40 may be applied to secure the spreading stability of the main chamber 30 and the sub-chamber 40 in the left and right and top and bottom directions.

Hereafter, an air bag cushion device 4 for protecting a pedestrian in accordance with a fourth exemplary embodiment of the present invention will be described in detail with reference to FIG. 14.

For convenience of description, the same components as those of the first exemplary embodiment are represented by like reference numerals, and the detailed descriptions thereof are omitted herein.

Figure 14:
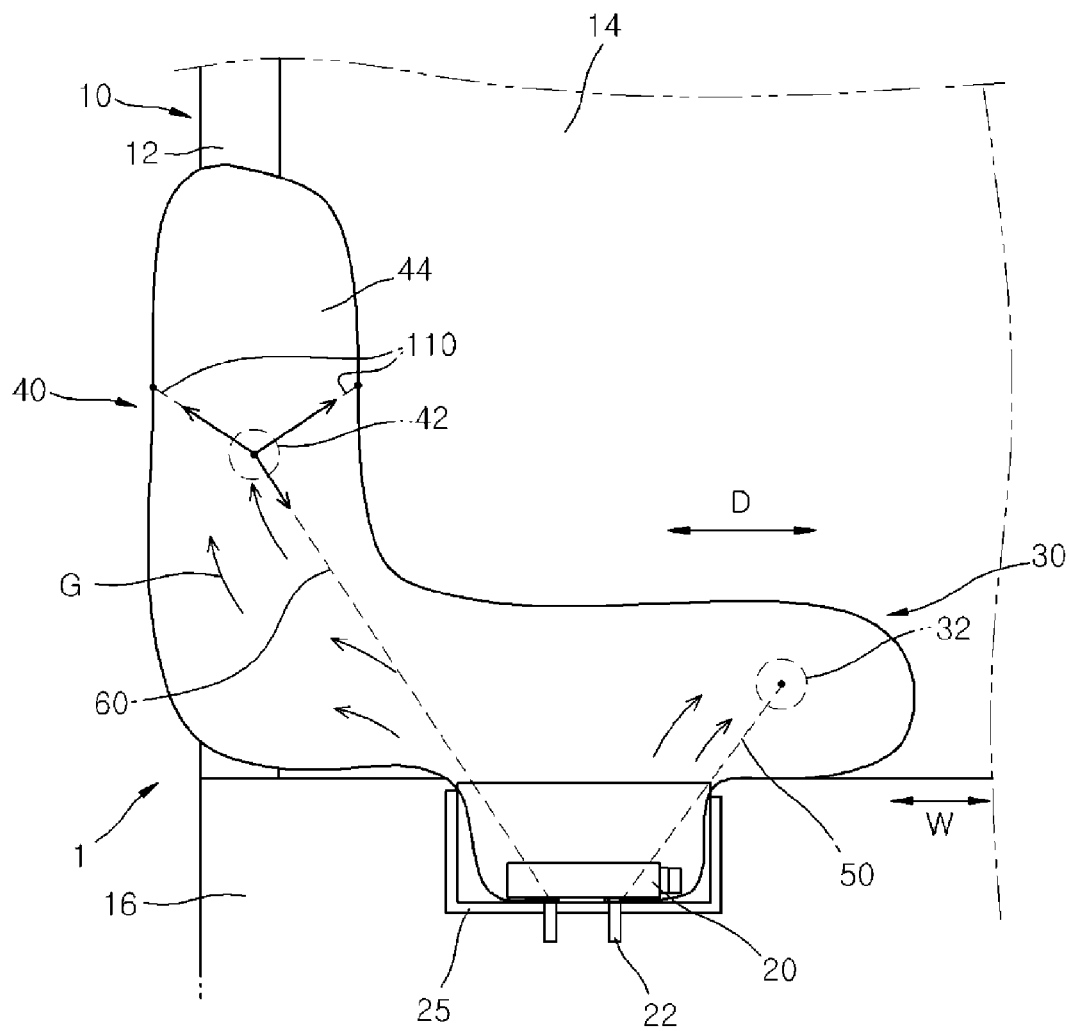
FIG. 14 is a front view illustrating the structure of an air bag cushion device for a protecting a pedestrian in accordance with an exemplary embodiment of the present invention.

FIG. 14 is a front view illustrating the structure of an air bag cushion device for a protecting a pedestrian in accordance with a fourth exemplary embodiment of the present invention.

As illustrated in FIG. 14, a third guide part 110 may be bifurcated from the second guide part 60 and connected to a plurality of points of the sub-chamber 40. The third guide part 110 in accordance with the fourth exemplary embodiment of the present invention may be bifurcated in a V-shape from the top of the second guide part 60 and connected to both top sides of the sub-chamber 40. The top of the second guide part 60 may be connected only to the third guide part 110, or connected to the inward-facing surface of the sub-chamber 40 and the third guide part 110, if necessary.

Thus, because the second and third guide parts 60 and 110 guide the expansion of the sub-chamber 40 when the sub-chamber 40 is spread, the working load of the sub-chamber 40 may be distributed in three directions along the second and third guide parts 60 and 110, thereby improving the spreading stability of the sub-chamber 40.

As described above, the air bag may be stably spread while the sub-chamber 40 expanded through the operation of the inflator 20 comes in contact with the outside of the A-pillar 12. Thus, the sub-chamber 40 may prevent a pedestrian from colliding with the A-pillar 12, thereby reducing the injury of the pedestrian.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An air bag cushion device for protecting a pedestrian, comprising:
    an inflator mounted on a vehicle body and generating working gas;
    a main chamber configured to receive the working gas generated from the inflator and expand in a widthwise direction of the vehicle;
    a sub-chamber connected to one side of the main chamber in a longitudinal direction, and configured to receive the working gas through the main chamber and expand to the outside of an A-pillar of the vehicle body; and
    a first connection member installed in the sub-chamber in the longitudinal direction facing the A-pillar,
    wherein:
    the main chamber is disposed at the front surface of a windshield glass for a vehicle, and the sub-chamber is connected to one side of the main chamber in a longitudinal direction; and
    after inflation, the main chamber is configured to extend above a hood of the vehicle and further along the widthwise direction than the sub-chamber.

2. The air bag cushion device of claim 1, wherein the first connection member connects the inward-facing surface of the sub-chamber, facing the A-pillar, to the outer surface of the sub-chamber, isolated from the A-pillar.

3. The air bag cushion device of claim 1, further comprising a gas discharge unit installed outside the inflator, the gas discharge unit comprising discharge ports formed at both sides thereof and configured to adjust a discharge amount of working gas generated from the inflator.

4. The air bag cushion device of claim 3, wherein the gas discharge unit comprises:
    a first discharge port configured to discharge working gas to one side of the main chamber, facing the sub-chamber; and
    a second discharge port configured to discharge working gas to the other side of the main chamber, corresponding to the opposite side of the first discharge port.

5. The air bag cushion device of claim 4, wherein the second discharge port has a larger area than the first discharge port.

6. An air bag cushion device for protecting a pedestrian, comprising:
    an inflator mounted on a vehicle body and generating working gas;
    a main chamber configured to receive the working gas generated from the inflator and expand in a widthwise direction of the vehicle;
    a sub-chamber connected to the main chamber, and configured to receive the working gas through the main chamber and expand to the outside of an A-pillar of the vehicle body;
    a first guide part connecting the main chamber to the vehicle body, and configured to guide the expansion of the main chamber; and a second guide part connecting the sub-chamber to the vehicle body, installed at a predetermined angle with respect to the first guide part, and configured to guide the expansion of the sub-chamber.

7. The air bag cushion device of claim 6, wherein the first and second guide parts are extended in the opposite diagonal directions from a mounting bracket on which the inflator is installed.

8. The air bag cushion device of claim 7, wherein the first and second guide parts are connected to the mounting bracket while crossing each other in an X-shape.

9. The air bag cushion device of claim 7, further comprising a third guide part diverging from the second guide part so as to be connected to a plurality of points of the sub-chamber.

10. The air bag cushion device of claim 6, wherein the first guide part is connected to the inward-facing surface of the main chamber facing the vehicle body, and the second guide part is connected to the inward-facing surface of the sub-chamber facing the vehicle body.

11. The air bag cushion device of claim 6, wherein the sub-chamber is divided into a plurality of chambers by a second connection member installed therein.

12. The air bag cushion device of claim 11, wherein the second guide part is connected to each of the chambers formed in the sub-chamber.

13. The air bag cushion device of claim 11, wherein the second connection member comprises a plurality of second connection holes through which working gas passes, and is installed in the widthwise direction of the vehicle body inside the sub-chamber.

14. The air bag cushion device of claim 13, wherein when the sub-chamber is spread, the second connection member is installed at a predetermined angle with respect to the A-pillar.

15. The air bag cushion device of claim 11, further comprising a first connection member positioned in the sub-chamber facing the A-pillar, and installed in a direction crossing the second connection member.

16. An air bag cushion device for protecting a pedestrian, comprising:
   an inflator mounted on a vehicle body and generating working gas;
   a main chamber configured to receive the working gas generated from the inflator and expand in a widthwise direction of the vehicle;
   a sub-chamber connected to the main chamber, and configured to receive the working gas through the main chamber and expand to the outside of an A-pillar of the vehicle body; and
   a first connection member installed in the sub-chamber facing the A-pillar, and connecting the inward-facing surface of the sub-chamber, facing the A-pillar, to the outer surface of the sub-chamber, isolated from the A-pillar, wherein:

the main chamber is disposed at the front surface of a windshield glass for a vehicle, and the sub-chamber is connected to one side of the main chamber in a longitudinal direction;

after inflation, the main chamber is configured to extend above a hood of the vehicle and further along the widthwise direction than the sub-chamber; and the first connection member comprises a plurality of first connection holes through which working gas passes.

* * * * *